(12) United States Patent
Yu (10) Patent No.: US 12,034,242 B2
(45) Date of Patent: Jul. 9, 2024

(54) EMBEDDED TERMINAL MODULE AND CONNECTOR AND MANUFACTURING AND ASSEMBLING METHOD THEREOF

(71) Applicant: Chia-Hsin Wang, New Taipei (TW)

(72) Inventor: Kuo-Chi Yu, Taipei (TW)

(73) Assignee: Chia-Hsin Wang, New Taipei (TW)

( * ) Notice: Subject to any disclaimer, the term of this patent is extended or adjusted under 35 U.S.C. 154(b) by 939 days.

(21) Appl. No.: 17/037,469

(22) Filed: Sep. 29, 2020

(65) Prior Publication Data
US 2022/0102895 A1    Mar. 31, 2022

(51) Int. Cl.
| | | |
|---|---|---|
| *B29C 70/72* | (2006.01) | |
| *H01R 13/11* | (2006.01) | |
| *H01R 13/20* | (2006.01) | |
| *H01R 13/627* | (2006.01) | |
| *H01R 13/05* | (2006.01) | |

(52) U.S. Cl.
CPC .......... *H01R 13/20* (2013.01); *B29C 70/72* (2013.01); *H01R 13/113* (2013.01); *H01R 13/6273* (2013.01); *H01R 13/055* (2013.01)

(58) Field of Classification Search
CPC .... H01R 13/20; H01R 13/113; H01R 13/405; H01R 43/24; H01R 12/7029; B29C 70/72; Y10T 29/49208; Y10T 29/49222
See application file for complete search history.

(56) References Cited

U.S. PATENT DOCUMENTS

| | | | | |
|---|---|---|---|---|
| 5,722,861 A | * | 3/1998 | Wetter | .................. H01R 43/16 29/884 |
| 5,725,392 A | * | 3/1998 | Bianca | .................. H01R 43/24 439/736 |
| 7,744,380 B2 | * | 6/2010 | Shuey | .................. H01R 13/405 439/79 |
| 10,720,732 B2 | * | 7/2020 | Zhao | .................. H01R 13/6594 |

* cited by examiner

*Primary Examiner* — Donghai D Nguyen
(74) *Attorney, Agent, or Firm* — Ying-Ting Chen (57) ABSTRACT

A method of manufacturing and assembling an embedded terminal module, comprising the steps of: (A) placing a terminal component in a mold; (B) a mating component partially over the terminal component to form a mating terminal component; (C) assembling at least two mating terminal component in a mirror-aligned manner to a mating socket to form the embedded terminal module.

6 Claims, 10 Drawing Sheets

EMBEDDED TERMINAL MODULE AND CONNECTOR AND MANUFACTURING AND ASSEMBLING METHOD THEREOF

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a connector, and more particularly to an embedded terminal module and a connector and a manufacturing and assembling method thereof, so as to reduce assembly tolerances and strengthen structural strength.

Description of Related Arts

Figure 1:
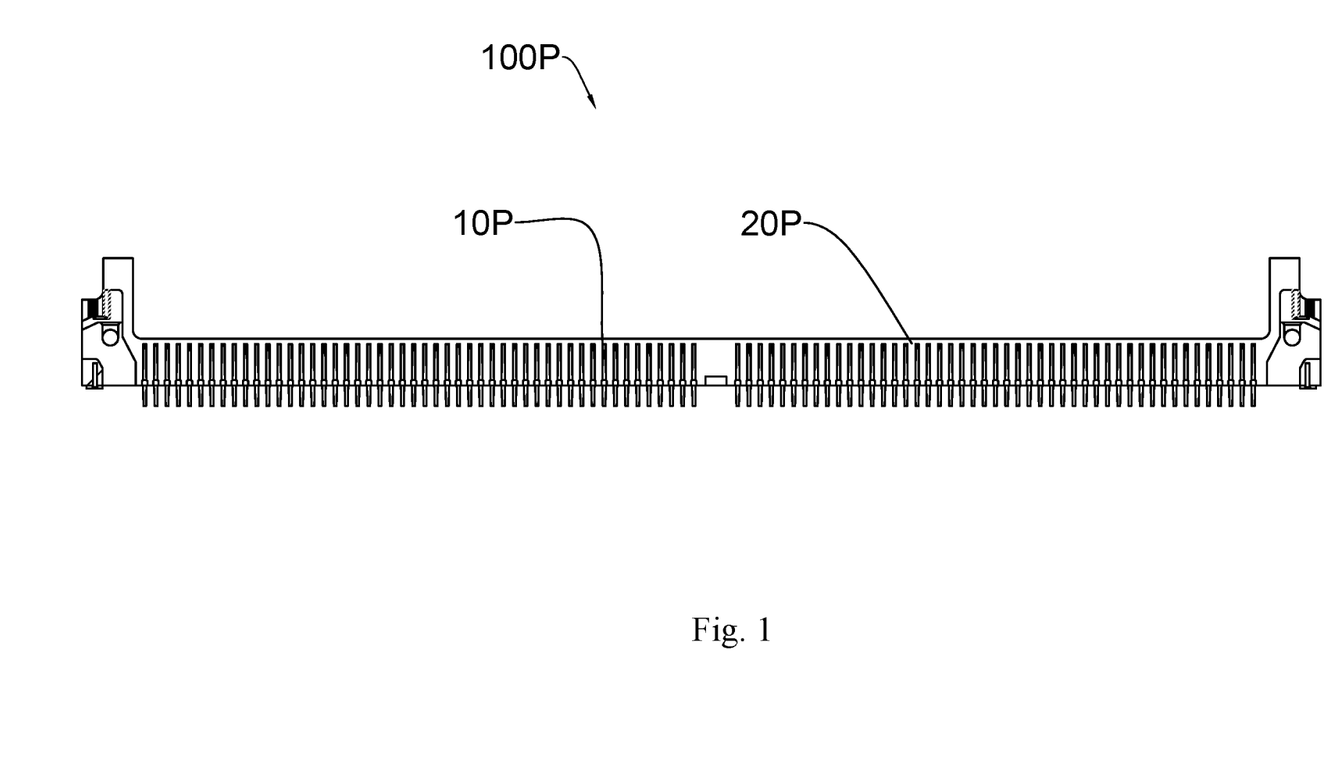
FIG. 1 is a schematic diagram of a conventional connector.

Nowadays rapid industrial development, which is an important component of the electronic connector is also in a state of rapid development. In order to allow products to perform better, various connector manufacturers are committed to developing new connector technologies. That is to say, the connector is a common electronic component, which is often used between the circuit board and the circuit board for signal transmission. To put it another way, the connector is the core center of the electronic transmission interface, and the quality of the connector will affect the service life of the product. However, as shown in FIG. 1, a conventional connector 100P usually directly inserts the terminal 10P into the plastic member 20P. In this way, when the plastic component 20P is deformed or a tolerance is generated during assembly, it will cause the difference of height phenomenon between the terminal 10P and the terminal 10P, which will affect the overall size. In particular, when the connector 100P is assembled on a circuit board, it will cause poor connection.

SUMMARY OF THE PRESENT INVENTION

An object of the present invention is to provide an embedded terminal module and a connector and a manufacturing and assembling method thereof to improve the unevenness between the terminals. Furthermore, the embedded injection connector of the present invention will avoid the problem of deformation or tolerance between the terminal and the plastic component.

An object of the present invention is to provide an embedded terminal module and connector and a manufacturing and assembling method thereof to reduce assembly tolerances and strengthen structural strength.

An object of the present invention is to provide an embedded terminal module and connector and a manufacturing and assembly method thereof, wherein an embedded element is used to cover a terminal element in a molding manner, and the embedded element is assembled in a mating socket, which will reduce the deformation of the terminal element during assembly.

An object of the present invention is to provide an embedded terminal module and a connector and a manufacturing and assembly method thereof, wherein the terminal element is implemented as a metal plate, and the positioning portion is removed after molding, so that each of pin elements becomes an independent connection point.

An object of the present invention is to provide an embedded terminal module and a connector and a manufacturing and assembly method thereof, wherein the embedded element will increase the structural strength of the terminal element.

In order to achieve at least one objective of the present invention described above, one aspect of the present invention provides a method for manufacturing and assembling an embedded terminal module, which comprises the following steps:
  (A) Setting a terminal element in a mold;
  (B) Making an embedded element partially cover the terminal element to form an embedded terminal element, and
  (C) Assembling at least two embedded terminal elements in a mating socket in a mirror-aligned manner to form the embedded terminal module.

In an embodiment of the method of the present invention, the method further includes the step (D) of separating and removing a positioning portion from a plurality of pin elements of the terminal element.

In an embodiment of the method of the present invention, wherein the positioning portion is easily separated from the pin elements through a series of separation lines.

In an embodiment of the method of the present invention, in step (A), the terminal element is arranged at a relative position of a mold through a positioning portion of the terminal element.

In an embodiment of the method of the present invention, in step (B), the embedded element simultaneously forms a plurality of buckle portions.

In an embodiment of the method of the present invention, in step (C), the embedded terminal element is fixed to the mating socket through a plurality of the buckle portions.

In an embodiment of the method of the present invention, in step (C), each of the embedded elements is respectively arranged in the embedded groove of the mating socket. The pin elements are arranged opposite to the terminal mating holes of the mating socket. When the embedded terminal element is installed in the mating socket, the buckle portions of the embedded element are located in the snap grooves of the mating socket.

In an embodiment of the method of the present invention, wherein the welded portion of each pin elements are bent relative to the pin body of each pin elements.

In an embodiment of the method of the present invention, wherein the terminal element is implemented as a metal plate.

In order to achieve at least one objective of the present invention, another aspect of the present invention provides a method for manufacturing and assembling a connector, wherein the connector is suitable for connecting an electronic component, and the method for manufacturing and assembling the connector comprises the following steps:
  (a) Molding to form at least two embedded terminal elements, which are mirrored and assembled to a mating socket to form an embedded terminal module;
  (b) Setting the embedded terminal module on a printed circuit board; and
  (c) movably installing a locking module at the embedded terminal module.

In an embodiment of the method of the present invention, in the step (b), the welded portion of the pin element of the terminal element of the embedded terminal element is welded and joined to the printed circuit board.

In an embodiment of the method of the present invention, in the step (b), the two locking elements of the locking module are respectively disposed on the two locking portions of the mating socket, wherein the two locking portions are respectively located at two ends of the socket body of the mating socket and extend upward.

In an embodiment of the method of the present invention, wherein in step (c), the locking module forms an unlocked state and a locked state relative to the mating socket.

In order to achieve at least one objective of the present invention described above, another aspect of the present invention provides an embedded terminal module, which is suitable for a connector, and comprises:

An embedded terminal component comprises at least two terminal elements and at least two embedded elements, wherein each of the embedded elements being molded to cover each of the terminal elements oppositely; and A mating socket, wherein the two terminal elements and the two i embedded elements are respectively assembled in the mating socket in mirror alignment.

In an embodiment of the present invention, wherein each of the terminal elements comprises a plurality of the pin elements, wherein each of the embedded elements respectively covers a plurality of the pin elements of each of the terminal elements, so that one of the terminal elements and one of the embedded elements are integrated.

In an embodiment of the present invention, wherein each of the terminal elements comprises a plurality of the pin elements and a positioning portion, wherein a series of separation lines are arranged between a plurality of the pin elements and the positioning portion so as to facilitate the removal of the positioning portion.

In an embodiment of the present invention, each of the pin elements comprises a pin body and a welded portion, wherein the welded portion is bent relative to the pin body.

In an embodiment of the present invention, each of the embedded elements comprises a embedded body, a plurality of embedded holes and a plurality of buckle portions, wherein a plurality of the pin elements are arranged opposite to a plurality of the embedded holes, wherein a plurality of the buckle portions respectively protrude from the embedded body, and the embedded terminal component is fixed to the mating socket through the buckle portions.

In an embodiment of the present invention, the mating socket comprises a socket body, a plurality of terminal mating holes and at least two embedded grooves, wherein a plurality of the terminal mating holes and at least two the embedded grooves are respectively located in the socket body and communicate with each other, wherein each of the embedded elements is arranged opposite each of the embedded grooves, and a plurality of the pin elements oppositely arranged in a plurality of the terminal mating holes.

In an embodiment of the present invention, each of the embedded grooves has a plurality of snap grooves, and a plurality of the buckle portions are relatively disposed in a plurality of the snap grooves.

In an embodiment of the present invention, the mating socket further comprises at least one socket groove, which is communicated with a plurality of the terminal mating holes, when a plurality of the pin elements are relatively arranged in a plurality of the terminal mating holes, each the elastic portion of the pin body of the pin element protrudes from the surface of the socket groove.

In an embodiment of the present invention, wherein the terminal element is implemented as a metal plate.

In order to achieve at least one objective of the present invention described above, another aspect of the present invention also provides an embedded terminal module, which is suitable for a connector and comprises:

An embedded terminal component comprises at least four terminal elements and at least four embedded elements, wherein each of the embedded elements being molded to cover each of the terminal elements oppositely; and A mating socket, wherein the four terminal elements and the four i embedded elements are respectively assembled in the mating socket in mirror alignment.

In order to achieve at least one objective of the present invention described above, another aspect of the present invention also provides a connector, including:

The above-mentioned embedded terminal module;

A printed circuit board, wherein the embedded terminal module is disposed on the printed circuit board; and A locking module is arranged on the embedded terminal module.

In an embodiment of the present invention, the locking module comprises two locking elements, and the mating socket comprises two locking portions. The two locking portions are respectively located at two ends of the socket body, and the two locking elements are respectively rotatably arranged on the two locking portions.

DETAILED DESCRIPTION OF THE PREFERRED EMBODIMENT

In order to fully understand the purpose, features and effects of the present invention, the following specific embodiments and accompanying drawings are used to give a detailed description of the present invention. The description is as follows:

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, the indicating direction or positional relationship of the terms "longitudinal", "lateral", "upper", "lower", "front", "rear", "left", "right", "Vertical", "Horizontal", "Top", "Bottom", "Inner", "Outer", etc. are based on the direction or positional relationship shown in the drawings, which is only for the convenience of describing the present invention and simplifying the description, rather than indicating or implying that the device or element referred to must have a specific orientation or be constructed and operated in a specific orientation. Therefore, the above terms cannot be understood as a limitation of the present invention.

It is appreciated that the term "a" should be considered as "at least one" or "one or more", that is, in one embodiment, the number of an element may be one, while in other embodiments, the number of elements can be multiple. The term "one" cannot be considered a restriction on quantity.

Figure 2:
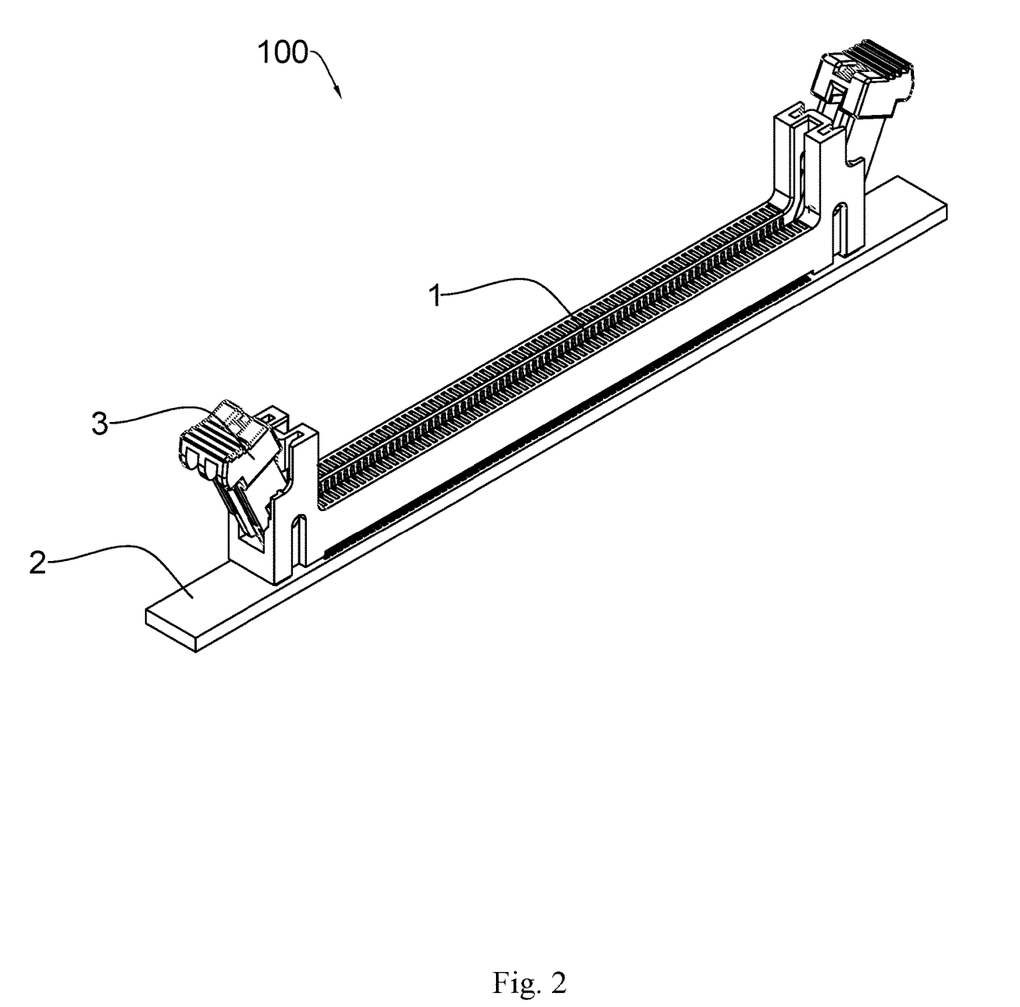
FIG. 2 is a perspective view of a connector according to a preferred embodiment of the present invention.
Figure 8:
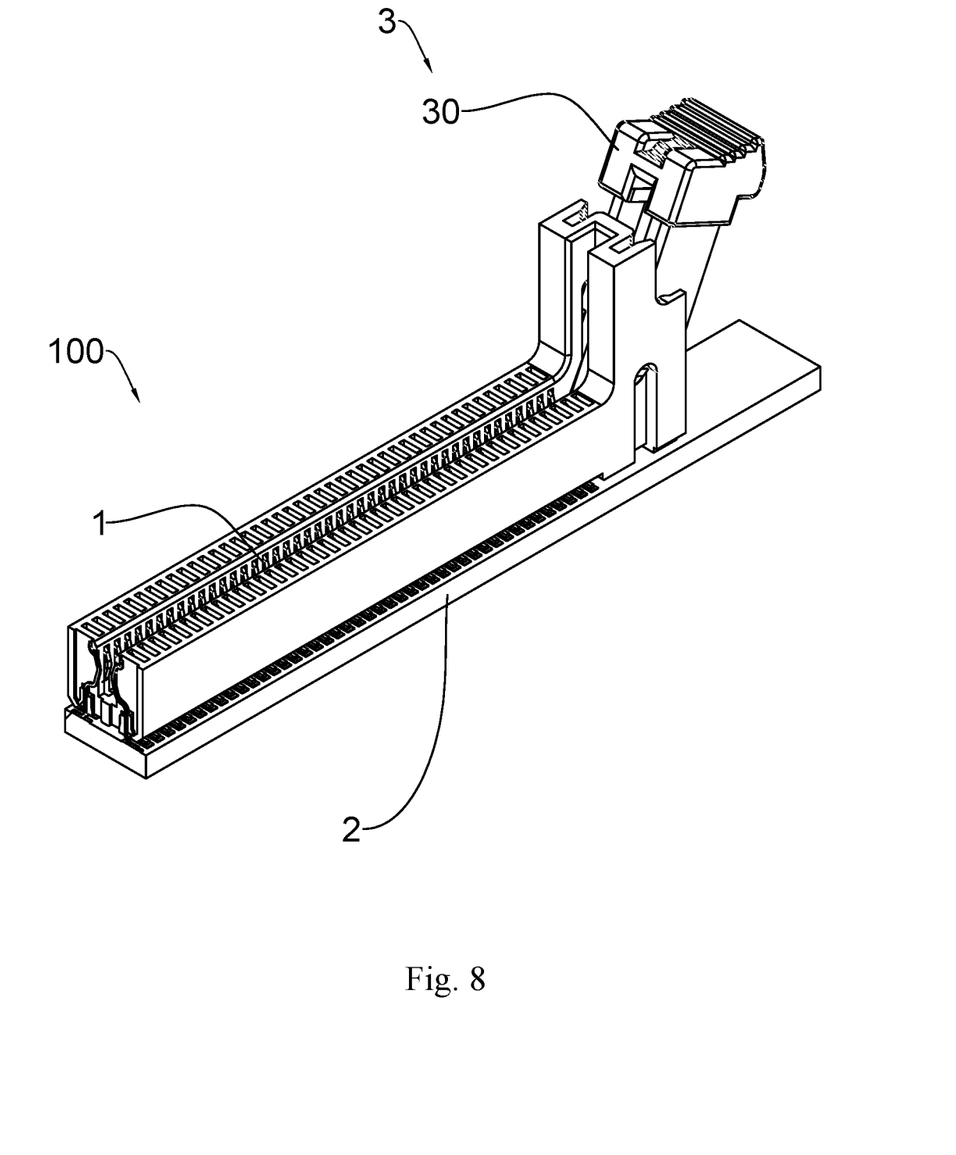
FIG. 8 is a sectional view of a connector according to a preferred embodiment of the present invention.

Referring to FIGS. 2 and 8, an embedded terminal module and a connector according to a preferred embodiment of the present invention. The connector 100 comprises an embedded terminal module 1, a printed circuit board 2, and a locking module 3. The embedded terminal module 1 is disposed on the printed circuit board 2 to serve as a connection device with electronic components. The locking module 3 is arranged on the embedded terminal module 1 so as to be fixed by the locking module 3 when the electronic component is connected to the embedded terminal module 1. In particular, when the electronic component is to be detached or removed from the embedded terminal module 1, the locking module 3 is in an unlocked state, so that the electronic component can be easily separated from the embedded terminal module 1.

In the embodiment of the present invention, the embedded terminal module 1 comprises an embedded terminal component 10 and a mating socket 20. The embedded terminal component 10 is mounted on the mating socket 20. The locking module 3 is disposed on the mating socket 20. The embedded terminal component 10 comprises at least two terminal elements 11 and at least two embedded elements 12. Each of the embedded elements 12 is molded to cover each of the opposite terminal elements 11 to form an embedded terminal element 101. The two embedded terminal elements 101 are assembled to the mating socket 20 in a mirrored manner. Furthermore, each of the terminal elements 11 and each of the embedded elements 12 are integrated into one body through the process of embedding and injection, so that each of the terminal elements 11 will maintain the same height relative to the mating socket 20. In other words, each of the terminal elements 11 comprises a plurality of pin elements 111, wherein a plurality of the pin elements 111 are set in the mold 900, and the embedded element 12 is formed by injection to cover a plurality of the pin elements 111, so that the terminal element 11 and the embedded element 12 are integrated. In particular, the embedded terminal component 10 comprises at least two of the terminal elements 11 and at least two of the embedded elements 12, wherein the two terminal elements 11 and the two embedded elements 12 are assembled in the mating socket 20 in a mirror-aligned manner. Furthermore, each of the terminal elements 11 is assembled on the mating socket 20 through each of the embedded elements 12. Because of the combination of the embedded element 12 and the mating socket 20, compared with the traditional terminal assembly method, the terminal element 11 will not be deformed, and each of the pin elements 111 maintains the same height relative to the mating socket 20. In addition, the number of the pin elements 111 is set in accordance with the connected electronic components, which is not a limitation of the present invention.

Figure 3:
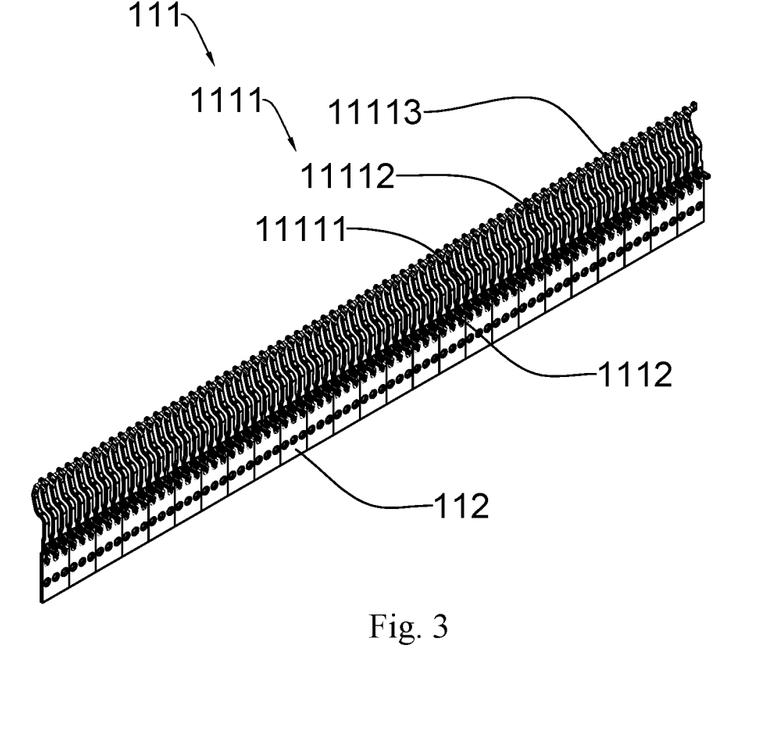
FIG. 3 is a perspective view of a terminal element of a embedded terminal module of a connector according to a preferred embodiment of the present invention.
Figure 4:
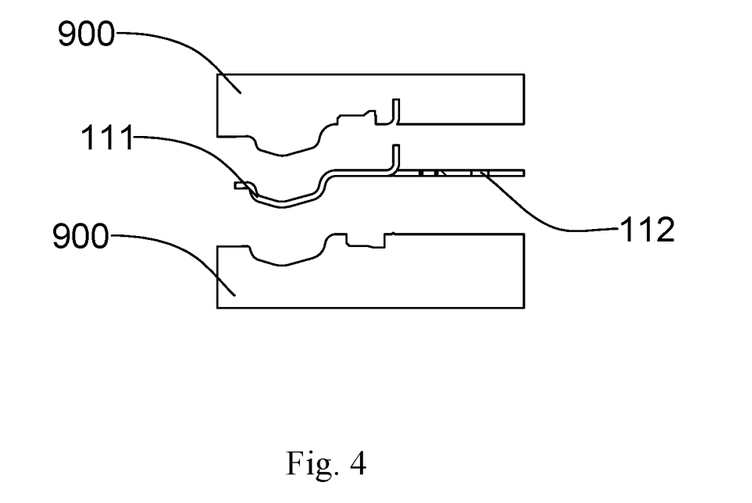
FIG. 4 is a schematic diagram of a terminal element of the embedded terminal module of the connector and a mold according to the preferred embodiment of the present invention.
Figure 7:
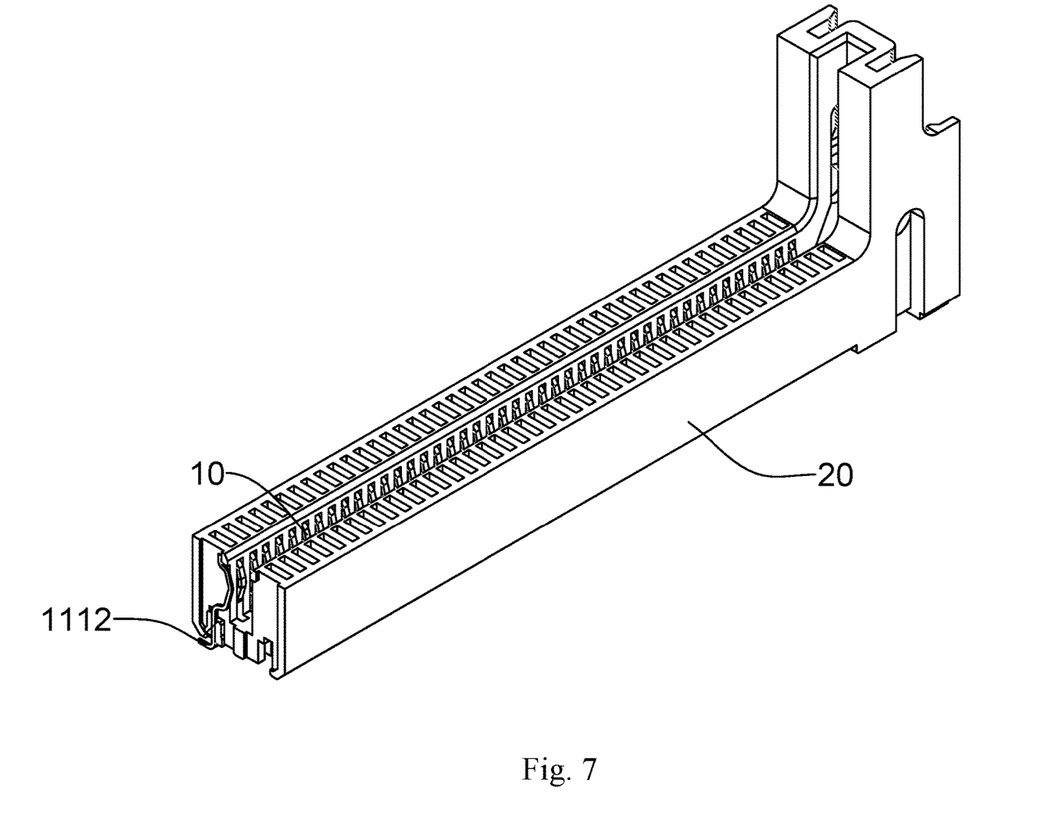
FIG. 7 is a perspective schematic view with the positioning part removed according to a preferred embodiment of the present invention.

In the embodiment of the present invention, each of the terminal elements 11 comprises a positioning portion 112, wherein a plurality of the pin elements 111 are connected to the positioning portion 112, so that when each of the terminal elements 11 is set in the mold 900, a relative position of each of the terminal elements 11 in the mold 900 is determined by the positioning portion 112. In particular, the positioning portion 112 has a plurality of positioning holes 1121, which are convenient for positioning when each of the terminal elements 11 is set in the mold 900. In addition, after each of the embedded elements 12 is molded to cover each of the terminal elements 11, the positioning portion 112 is separated and removed from a plurality of the pin elements 111, so that each of the pin elements 111 is an independent element. Further to say, each of the terminal elements 11 is implemented as a metal plate, which has a plurality of the pin elements 111 and the positioning portion 112, when the positioning portion 112 is separated from a plurality of the pin elements 111, each of the pin elements 111 becomes an independent metal pin. Each of the terminal elements 11 has a series of separation lines 102 which are disposed between the pin elements 111 and the positioning portion 112 so that the positioning portion 112 is easily separated from the pin elements 111. In addition, each of the pin elements 111 comprises a pin body 1111 and a welded portion 1112, wherein the welded portion 1112 is bent relative to the pin body 1111. When the embedded terminal module 1 is installed on the printed circuit board 2, it is fixed by welding through the welded portion 1112. The pin body 1111 has an embedded portion 11111, an elastic portion 11112 and an extending portion 11113, wherein the elastic portion 11112 protrudes and bends between the embedded portion 11111 and the extending portion 11113. The embedded element 12 is formed in the embedded portion 11111. The elastic portion 11112 is used to ensure contact with the electronic components. The extending portion 11113 is used to guide the electronic component to contact the elastic portion 11112.

Figure 5:
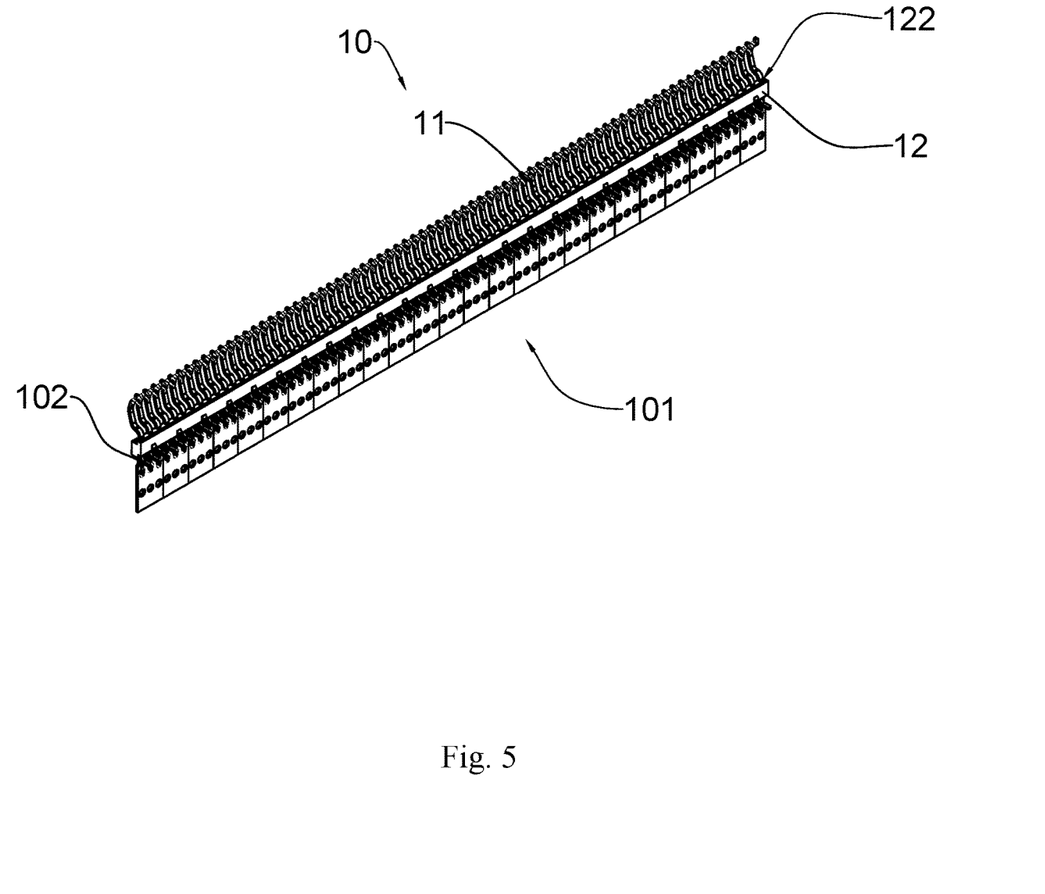
FIG. 5 is a perspective schematic view of the terminal element being molded by the embedded element according to the preferred embodiment of the present invention.
Figure 6:
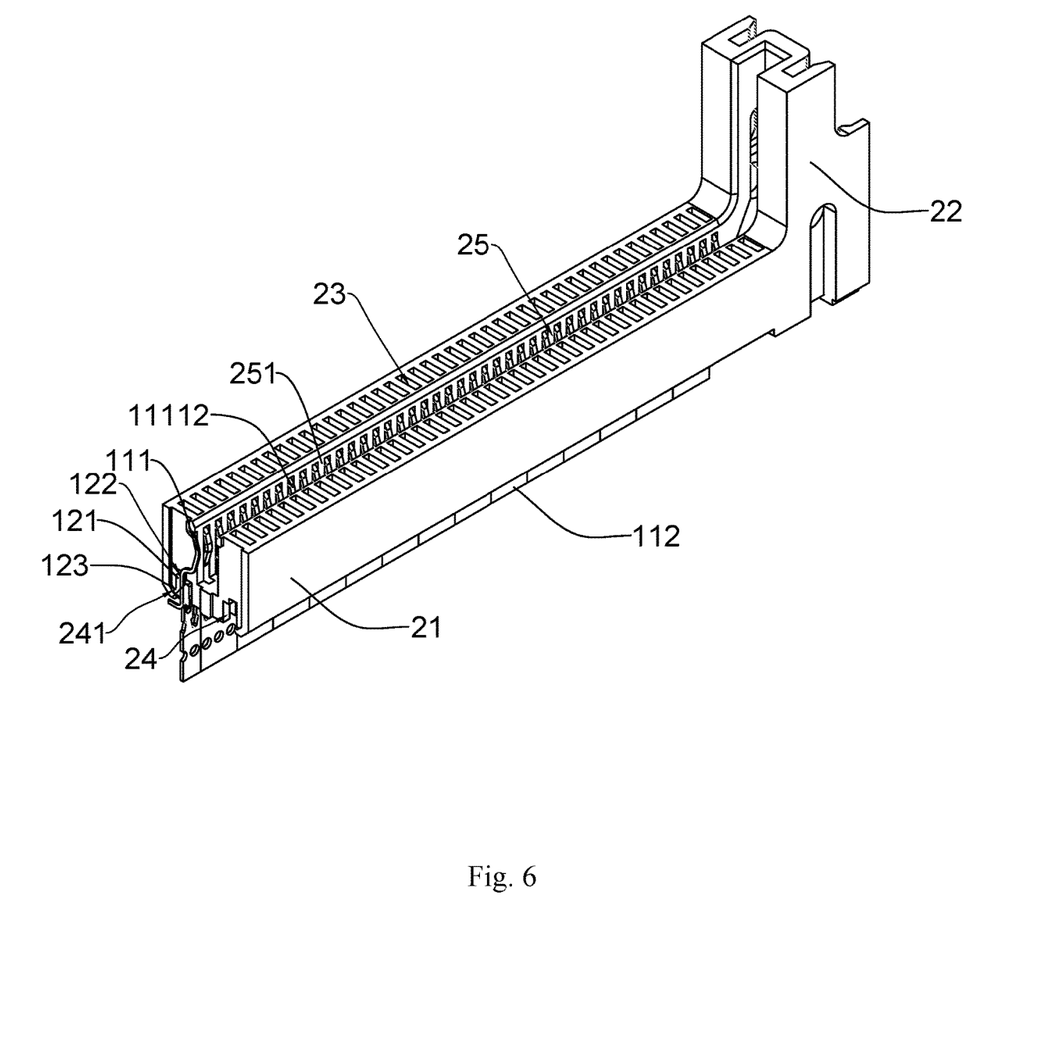
FIG. 6 is a perspective schematic view of the embedded terminal component device in the mating socket according to the preferred embodiment of the present invention.

In the embodiment of the present invention, each of the embedded elements 12 comprises a embedded body 121 and a plurality of embedded holes 122. The number of the embedded holes 122 is equal to the number of the pin elements 111. In other words, a plurality of the pin elements 111 are arranged opposite to a plurality of the embedded holes 122. each of the embedded elements 12 further comprises a plurality of buckle portions 123 which are respectively protrudingly provided on the embedded body 121. When the embedded terminal components 10 are installed in the mating socket 20, each of the embedded terminal components 10 is fixed to the mating socket 20 through a plurality of the buckle portions 123.

In the embodiment of the present invention, the locking module 3 comprises two locking elements 30. The mating socket 20 comprises a socket body 21, two locking portions 22, a plurality of terminal mating holes 23 and at least two embedded grooves 24. The two locking portions 22 are respectively located at two ends of the socket body 21 and extend upward to be used for installing the locking elements 30 respectively. Furthermore, the locking element 30 is rotatably disposed on the locking portion 22. A plurality of the terminal mating holes 23 and the two embedded grooves 24 are respectively located in the socket body 21 and communicate with each other. When the embedded terminal component 10 is installed in the mating socket 20, the embedded elements 12 are respectively disposed in the embedded grooves 24, and a plurality of the pin elements 111 are disposed opposite to a plurality of the terminal mating holes 23. It is worth mentioning that each of the embedded grooves 24 has a plurality of snap grooves 241, wherein when the embedded terminal component 10 is installed in the mating socket 20, a plurality of the buckle portions 123 are located opposite to a plurality of the snap grooves 241 respectively. In addition, the mating socket 20 further comprises at least one socket groove 25 which communicates with a plurality of the terminal mating holes 23. When a plurality of the pin elements 111 are relatively disposed in a plurality of the terminal mating holes 23, the elastic portion 11112 of the pin body 1111 of each pin element 111 protrudes from a surface 251 of the socket groove 25 to conveniently contact with electronic components.

Figure 9:
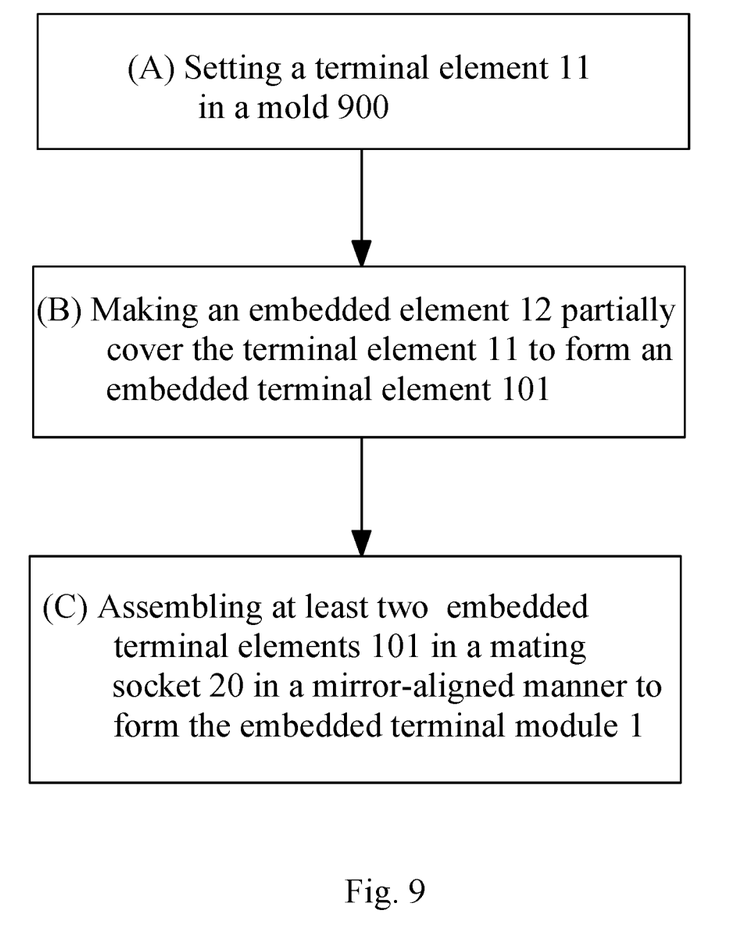
FIG. 9 is a logical schematic diagram of the manufacturing and assembling method of the embedded terminal module according to a preferred embodiment of the present invention.

In addition, as shown in FIG. 9, the present invention provides a method for manufacturing and assembling an embedded terminal module, which comprises the following steps:

(A) Setting a terminal element 11 in a mold 900;
(B) Making an embedded element 12 partially cover the terminal element 11 to form an embedded terminal element 101; and
(C) Assembling at least two embedded terminal elements 101 in a mating socket 20 in a mirror-aligned manner to form the embedded terminal module 1.

Further, it also comprises step (D) of separating and removing a positioning portion 112 from a plurality of pin elements 111 of the terminal element 11. In other words, each of the pin elements 111 becomes an independent communication element. Furthermore, a series of separation lines 102 are provided between a plurality of the pin elements 111 of the terminal element 11 and the positioning portion 112 of the terminal element 11, so that the positioning portion 112 is easily separated from the pin elements 111.

In the step (A), the terminal element 11 is arranged at the relative position of the mold 900 through the terminal element 112 to ensure that a plurality of the pin elements 111 maintain the same height.

In the step (B), the embedded element 12 forms a plurality of buckle portions 123 at the same time.

In the step (C), the embedded terminal element 101 is fixed to the mating socket 20 through a plurality of the e buckle portions 123.

In the step (C), each of the embedded elements 12 is respectively arranged in the embedded groove 24 of the mating socket 20. each of the pin elements 111 is disposed opposite to each of the terminal mating holes 23 of the mating socket 20. When each of the embedded terminal elements 101 is installed in the mating socket 20, each of the buckle portions 123 of the embedded element 12 is located in each of the snap grooves 241 of the mating socket 20.

In the above method, the welded portion 1112 of each of pin elements 111 is bent relative to the pin body 1111 of each of pin elements 111.

In the above method, the terminal element 11 is implemented as a metal plate, which has a plurality of the pin elements 111 and the positioning portion 112. When the positioning portion 112 is separated from a plurality of the pin elements 111, each of the pin elements 111 becomes an independent metal pin. Furthermore, the separation line 102 is formed in advance between a plurality of the pin elements 111 and the positioning portion 112, in order to facilitate the removal of the positioning portion 112 from the pin elements 111 after the embedded terminal element 101 is molded or after the embedded terminal element 101 is assembled with the mating socket 20.

Figure 10:
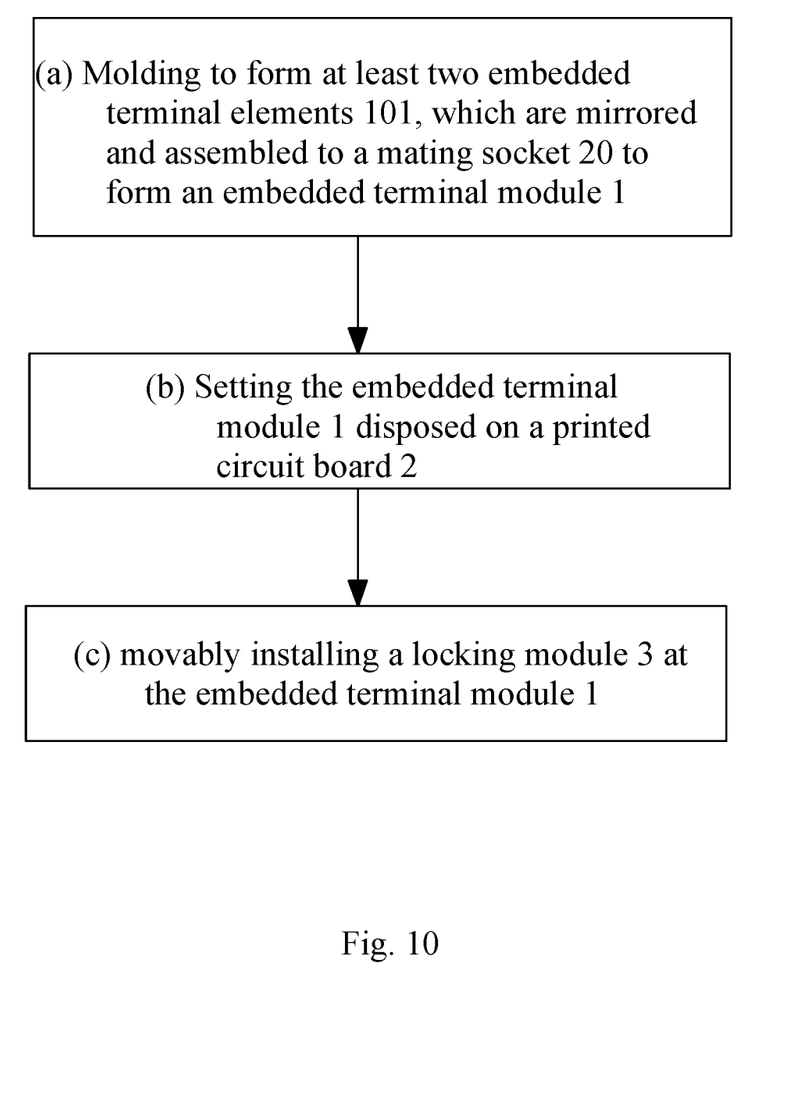
FIG. 10 is a logical schematic diagram of the manufacturing and assembling method of the connector according to a preferred embodiment of the present invention.

In addition, as shown in FIG. 10, the present invention provides a method for manufacturing and assembling a connector, wherein the connector is suitable for connecting an electronic component, and the method for manufacturing and assembling the connector comprises the following steps:

(a) Molding to form at least two embedded terminal elements 101, which are mirrored and assembled to a mating socket 20 to form an embedded terminal module 1;
(b) Setting the embedded terminal module 1 disposed on a printed circuit board 2; and
(c) movably installing a locking module 3 at the embedded terminal module 1.

In the step (b), the welded portion 1112 of the pin element 111 of the terminal element 11 of each of the embedded terminal elements 101 and the printed circuit board 2 are welded and joined.

In the step (c), the two locking elements 30 of the locking module 3 are respectively disposed on the two locking portions 22 of the mating socket 20, wherein the two locking portions 22 are respectively located at two ends of the socket body 21 of the mating socket 20 and extend upward.

In the step (c), the locking module 3 has an unlocked state and a locked state relative to the mating socket 20. In other words, when the electronic component is to be detached or removed from the embedded terminal module 1, the locking module 3 is in an unlocked state, so that the electronic component can be easily separated from the embedded terminal module 1. When the electronic component is installed in the embedded terminal module 1, the locking module 3 is in a locked state to fix the electronic component.

Figure 11:
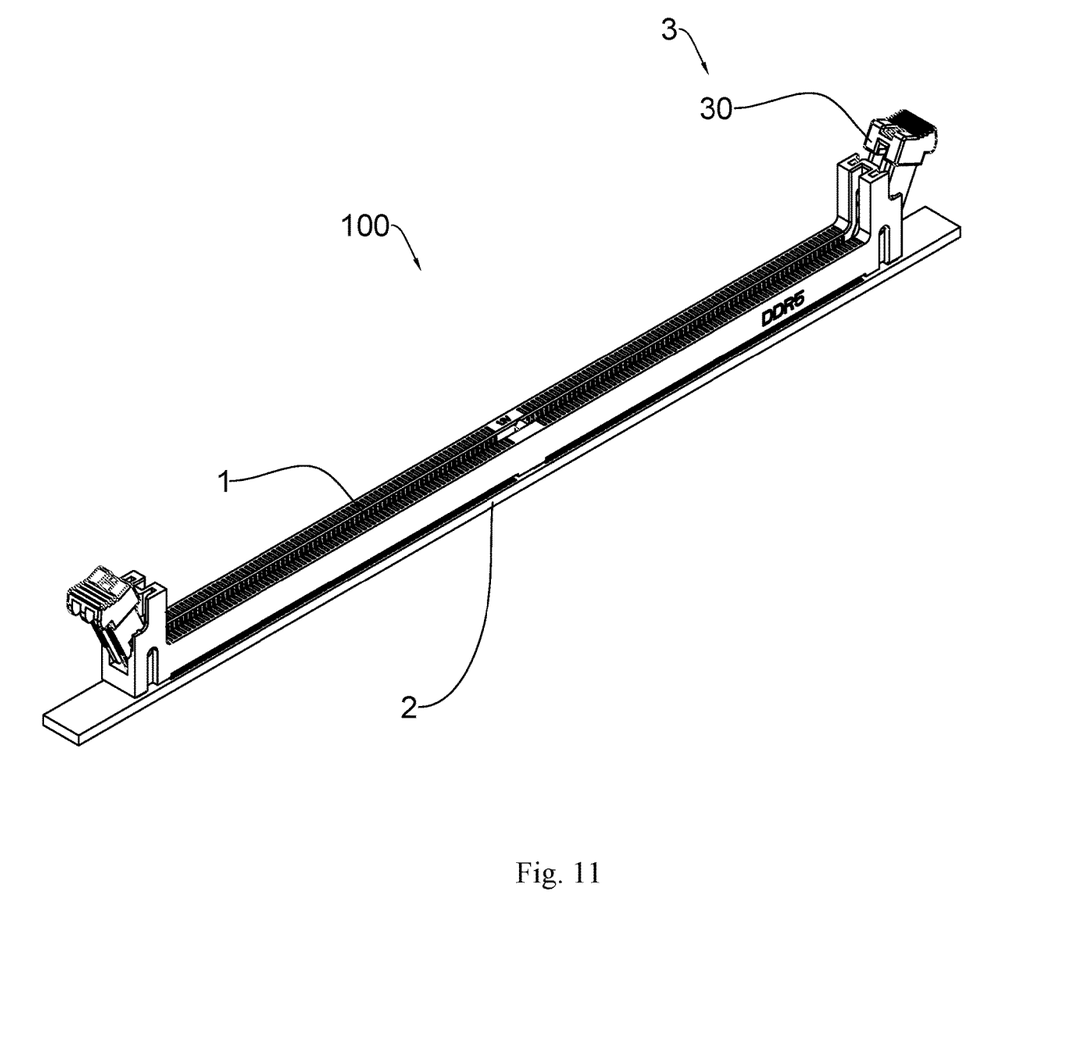
FIG. 11 is a perspective view of a modified embodiment of the connector according to the preferred embodiment of the present invention.

As shown in FIG. 11, it is an embedded terminal module and its connector according to a modified embodiment of the preferred embodiment of the present invention. The embedded terminal component 10 includes at least four sets of terminal elements 11 and at least four sets of embedded elements 12. Each set of the embedded elements 12 is relatively molded to cover each set of the terminal elements 11, and the four sets of the embedded elements 12 are divided into two groups, which are assembled in the mating socket 20 in a relatively mirror manner. Furthermore, the electronic components applicable to the connector 100 of this modified embodiment can be implemented as DDRS, but this is not a limitation of the present invention.

One skilled in the art will understand that the embodiment of the present invention as shown in the drawings and described above is exemplary only and not intended to be limiting. The purpose of the present invention has been completely and effectively achieved. The functions and structural principles of the present invention have been shown and explained in the embodiments. Without departing from the principles, the implementation of the present invention may have any deformation or modification.

What is claimed is:

1. A method for manufacturing and assembling an embedded terminal module, comprising the steps of:
   (A) Setting a terminal element in a mold, said terminal element is set at a relative position of the mold by a positioning portion of said terminal element, the terminal element comprises pin elements, a welded portion of each of said pin elements is bent relative to a pin body of each of said pin elements, and the welded portion is connected to the positioning portion;
   (B) Making an embedded element partially cover said terminal element to form an embedded terminal element; and
   (C) Assembling at least two of said embedded terminal elements in a mating socket in a mirror-aligned manner to form said embedded terminal module; and
   (D) separating and removing the positioning portion from the plurality of pin elements of said terminal element, and when the embedded terminal module is installed on a printed circuit board, the embedded terminal module and the printed circuit board are fixed by welding through the welded portion.

2. The manufacturing and assembling method of the embedded terminal module, as recited in claim 1, wherein said positioning portion is easily separated from a plurality of said pin elements through a series of separation lines.

3. The manufacturing and assembling method of the embedded terminal module, as recited in claim 1, wherein in step (B), said embedded element simultaneously forms a plurality of buckle portions.

4. The manufacturing and assembling method of the embedded terminal module, as recited in claim 3, wherein in step (C), each of said embedded terminal elements is fixed to said mating socket by a plurality of said buckle portions.

5. The manufacturing and assembling method of the embedded terminal module, as recited in claim 1, wherein in step (C), each of said embedded elements is respectively arranged in said embedded groove of said mating socket, and a plurality said of pin elements are arranged opposite to a plurality of terminal mating holes of said mating socket, and when each of said embedded terminal elements is installed in said mating socket, a plurality of buckle portions of said embedded element are respectively located in a plurality of engaging grooves of said mating socket.

6. The manufacturing and assembling method of the embedded terminal module, as recited in claim 1, wherein said terminal element is implemented as a metal plate.

* * * * *